Oct. 7, 1969
J. A. PATTERSON
3,471,261
METHOD AND MEANS OF OVERCOMING UNDESIRABLE ELECTRICAL
FORCES IN A CHROMATOGRAPHIC PROCESS
Filed Nov. 16, 1966
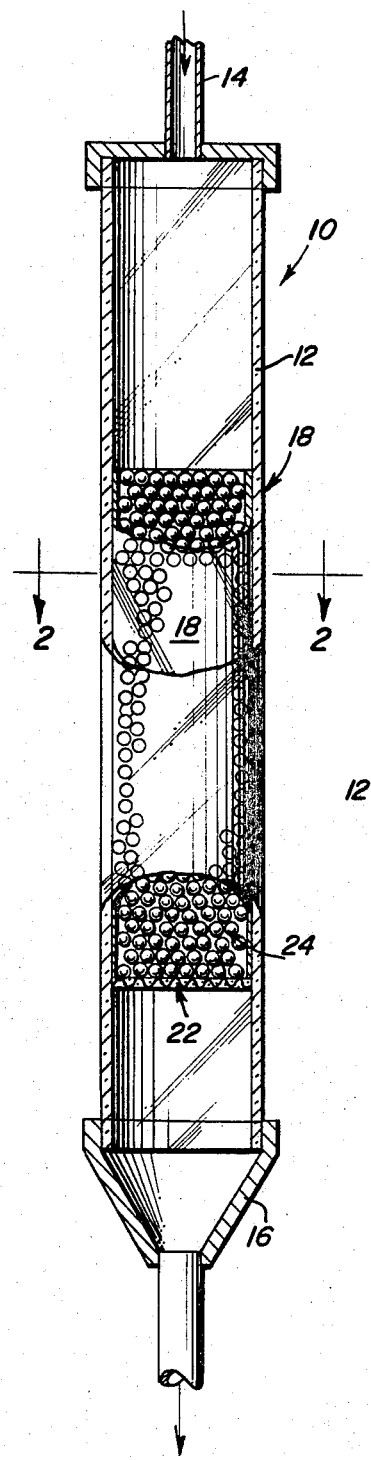
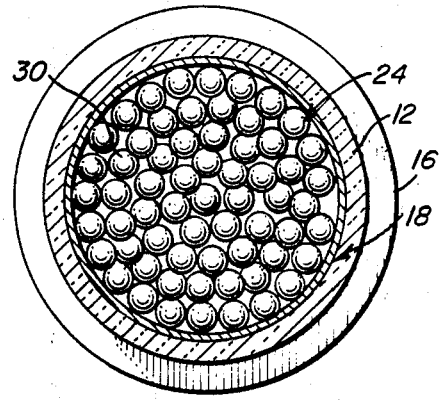
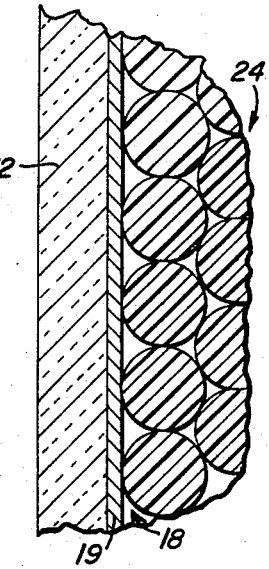
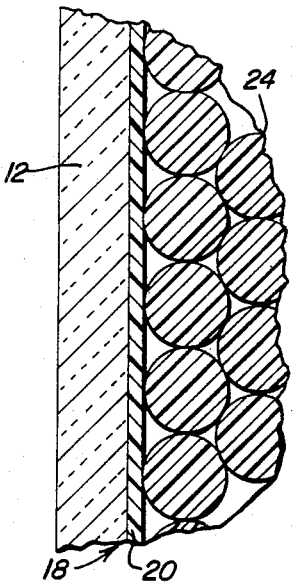
James A. Patterson
INVENTOR.
BY *Clarence A. O'Brien*
and *Harvey B. Jackson*
Attorneys

United States Patent Office 3,471,261
Patented Oct. 7, 1969

---

3,471,261
METHOD AND MEANS OF OVERCOMING UNDE-SIRABLE ELECTRICAL FORCES IN A CHROMATOGRAPHIC PROCESS
James A. Patterson, 727 Viola Place,
Los Altos, Calif. 94022
Filed Nov. 16, 1966, Ser. No. 594,906
Int. Cl. G01n *31/08, 31/04*
U.S. Cl. 23—230
9 Claims

---

ABSTRACT OF THE DISCLOSURE

A method and means of overcoming van der Waal's forces as well as other undesirable charges of electrical nature present in a chromatographic process by providing a path of discharge for these forces other than through the resin or eluant phases by means of a relatively conductive metallic or polyelectrolyte coating on the interior surfaces of a chromotographic column, which coating is generally transparent and not adversely affected by the eluant, buffers, regenerating media, etc. normally encountered in the utilization of the column.

---

The present invention relates to a method and means of modifying certain charges of an electrical natural encountered in chromatographic apparatus and more particularly to a method and means of overcoming the disrupting van der Waal's forces and other electrical charges produced by flowing media oftentimes encountered in chromatographic analysis procedures. More specifically the present invention is concerned with a method and means of increasing the effective cross-sectional area of chromatographic columns and especially those of a generally transparent nature.

A problem often arises in chromatographic processes and particularly liquid-solid phase ion exchange chromatographic processes, under generally non-equilibrium conditions, due to the effect of random van der Waal's forces which cause bonding of a portion of an investigational sample to the chromatographic column so as to adversely affect the resolution thereof while simultaneously substantially reducing the effective cross-sectional area column relative to the true cross-sectional area due to the relatively non-flowing eluant present at the interface with the column.

For example, when glass tubing suitable for chromatographic apparatus is produced, and particularly tubing characterized by a uniform bore, there are developed random patterns of crystal strains or charges of an electrical nature in any one piece of glass tubing. These strains are the result of a great number of variables a few of which are known to be: the composition of the glass, i.e. presence of contaminant particles; composition and condition of the tube forming mandrel; the release agent utilized to coat the forming mandrel; the forming and annealing temperatures; etc. It is this random charge pattern along a chromatographic column which creates difficulties especially at high pressure operation or when very small investigational samples are used inasmuch as stated heretofore the efficiency and resolution characteristics of a chromatographic column are adversely affected by such conditions.

It is therefore a primary object of the present invention to provide a method and means of overcoming the disruptive van der Waal's forces and other undesirable charges encountered in chromatographic processes.

Another object of the present invention is to provide a method and means of overcoming the van der Waal's forces and other undesirable charges encountered in a chromatographic process comprising a liquid-solid phase ion exchange process under nonequilibrium conditions.

A further object of the present invention is to provide a method and means of overcoming van der Waal's forces in a chormatographic process wherein a chromatographic column fabricated from electrically relatively non-conductive material is provided with an interiorly disposed electrically relatively conductive coating so as to effectively neutralize the van der Waal's forces inherent in the material utilized to form the chromatographic column whereby the resolution characteristics and efficiency of the chromatographic column are significantly improved.

Still another object of the present invention is to provide a method and means of overcoming van der Waal's forces as well as other undesirable charges of electrical nature present in a chromatographic process by providing a path of discharge for these forces other than through the resin or eluant phases by means of a relatively conductive metallic or polyelectrolyte coating on the interior surfaces of a portion of a chromatographic column, which coating is of such a nature so as to be generally transparent and not adversely affected by the eluant, buffers, regenerating media, etc., normally encountered in the utilization of the column.

Still a further object of the present invention is to provide a method and means of increasing media flow rates through an ion exchange column of a given geometrical cross-sectional area without exceeding the rupture pressure of the column while simultaneously increasing the resolution of the sample being chromatographically analyzed.

Still a further object of the present invention is to provide a method and means of effectively neutralizing a streaming potential such as developed by the media flowing through the chromatographic column and particularly through the capillary interstices present between the packed ion exchange resin particles comprising the column packing.

These together with other objects and advantages which will become subsequently apparent reside in the details of the chromatographic method and the construction of chromatographic apparatus as more fully hereinafter described and claimed, reference being had to the accompanying drawings forming a part hereof, wherein like numerals refer to like parts throughout, and in which:

FIGURE 1 is a side elevational view of a typical liquid-solid ion exchange resin chromatographic column constructed in accordance with the principles of the present invention showing the generally transparent nature of the column and further showing in vertical section certain details thereof;

FIGURE 2 is an enlarged horizontal cross-sectional view of the chromatographic column of FIGURE 1 taken substantially along the plane of the line 2—2 of FIGURE 1 and further showing by imaginary circle, in phantom lines, how the true geometrical cross-sectional area of a chromatographic column is often reduced to an effective cross-sectional area as bounded by the phantom line circle;

FIGURE 3 is an enlarged fragmentary vertical sectional view of a portion of the chromatographic column of FIGURE 1, taken intermediate the ends of the resin bed therein, further showing the interior wall of the column being coated with a generally transparent electrically conductive metallic coating; and FIGURE 4 is a fragmentary enlarged vertical sectional view of a portion of the chromatographic column of FIGURE 1 somewhat analogous to that shown in FIGURE 3 with the exception that the electrically conductive coating on the interior of the column is shown as being a relatively non-metallic polyelectrolytic coating.

Briefly, the present invention comprises a liquid-solid phase ion exchange chromatographic process under generally non-equilibrium conditions wherein the liquid pressures encountered are in the range of approximately 10–1000 p.s.i. during resolution of a sample with a usual operating range of approximately 200–600 p.s.i. The chromatographic columns are generally fabricated from a suitable grade of glass or other generally transparent material such as plastic, for example, which is capable of withstanding the aforementioned pressures and is sufficiently inert so as to be substantially incapable of physical or chemical reaction with the elution liquids or ion exchange resins utilized in conjunction with the chromatographic column. From the foregoing it will be appreciated that the material comprising the column, and consequently the column itself, is a generally electrically non-conductive substance. Accordingly, the present invention contemplates coating the interior of chromatographic columns formed of such generally electrically non-conductive substances with generally electrically conductive substances such as metallic elements, alloys, polyelectrolytes and the like.

The metals or types of metal alloys which can be used are only limited by the column operating conditions, e.g. stability of the metallic coating with respect to buffer solutions, etc., such as in the range of pH 1.0–11.0, for example. A number of metals, a few of which will be named hereinafter, are properly included in a category defined by the above-mentioned parameters and include such elemental metals, alloys or metallic oxides thereof as rhodium, gold, silver, platinum, nickel, iron, cobalt, copper, aluminum as an oxide, magnesium as an oxide, chromium salt (stabilized) etc. In addition, certain salts of these metals which are generally inert under the operating conditions encountered may be utilized and include such salts as sodium citrate, pyridine, etc. which when applied to the chromatographic column do not interfere with the bonds to be chromatographed, i.e., the highly insoluble chromate salts of gold and silver, for example.

With respect to the polyelectrolytes which may be utilized to provide the generally electrically conductive coating, the same generalized teaching applies as does with regard to the selection of metal or metal salt surfaces. By way of example, such polyelectrolytes may comprise proteins, polysaccharides, alkyl halide addition products to polyvinyl pyridine. It will therefore be appreciated that a characteristic of the polyelectrolytes not covered in the parameters established for metallic coatings is the molecular weight of the polyelectrolyte. As an example of this, high molecular weight sulfonated polystyrene, for example, of greater than 200,000 have been applied where an ionic cross-linking was effected with barium salts to give an ionicly linked polyelectrolyte to bond to the interior surface of the chromatographic column. Although not mentioned heretofore, it will be appreciated that the generally electrically conductive coating contemplated by the present invention extends along a sufficient length of the column so as to be contiguous with the ion exchange resin packing therein along a substantial portion, if not total length thereof.

The generally electrically conductive coating is preferably transparent so that air bubbles, etc. can be observed and corrective action taken during operation of a chromatographic column constructed and used in accordance with the present invention. It will therefore be appreciated that particularly with regard to the metallic coatings the maximum thickness is limited to one at which the coating is no longer transparent or substantially transparent. The minimum thickness of the electrically conductive coating is determined by that necessary to form a stable electrically conductive surface on the interior of the column to effectively neutralize random van der Waal's forces or other electrical charges present which require intersurface discharge or interneutralization. Accordingly, it is not desired to limit the coating to one of a specific thickness but merely to the parameters whereby it is generally transparent and thick enough to form a conductive surface.

Referring now specifically to the drawings and FIGURE 1 in particular, it will be noted that the method of the present invention for the reduction of van der Waal's forces and other electrical charges within a chromatographic column contemplates the construction of a column indicated generally at 10 which comprises a generally tubular glass column 12 provided with suitable eluant inlet and outlet means 14 and 16 respectively. As discussed heretofore as with most chromatographic columns the glass column 12 is characterized by random van der Waal's forces which tend to adversely affect the resolution and flow characteristics of a chromatographic column of the nature illustrated.

Accordingly, it will be seen that a portion of the length of the interior of the glass column 12 is provided with an integral generally transparent conductive coating indicated at 19. As will be seen more specifically in FIGURE 3 the conductive coating 19 ilustrated therein is understood to be of a generally metallic nature. In FIGURE 4, however, it will be noted that the conductive coating indicated generally at 18 comprises a generally nonmetallic polyelectrolyte coating 20. It will be understood that the respective conductive coatings 19 and 20 conform to the parameters set forth hereinabove.

Inasmuch as the present invention is not concerned with the specific method or means of providing the glass column 12, or other chromatographic columns, with the electrically conductive coating 18 it is not considered necessary to dwell upon the method of coating the column. However, it will be readily apparent to those familiar with the construction of laboratory equipment that the glass column 12 can be provided with the conductive coating 18 such as by means of a conventional metallizing-metal vapor deposition procedure or other suitable conventional liquid film coating procedure.

The chromatographic apparatus 10 is further provided with a conventional resin bed support means indicated generally at 22 such as a fritted ceramic porous or glass fiber plug for example. In the exemplary embodiment illustrated the chromatographic apparatus 10 is shown packed with a spherical resin indicated generally at 24 comprising an ion exchange resin suitable for the sample to be resolved.

Example I

To more specifically illustrate the practice of the method of the present invention the use of the apparatus 10 will be discussed with regard to the accelerated chromatographic analysis of amino acids commonly found in physiological fluids. By way of illustration, the glass column 12 comprises a 69 x 0.90 cm. chromatographic column for the analysis of acidic and neutral acids. A buffer flow rate of 50 ml./hr. was used to pack the column to a height of approximately 55.5 cm. with a sulfonated styrene copolymer resin, nominally 8% cross-linked, distributed by Beckman Instruments, Inc. under the designation Beckman Custom Research Resin Type AA–15. The column was packed at a column temperature of approximately 30° C.

The spherical particles 24 have a mean diameter of 22±6 microns. This resin is normally used for the analysis of acidic and neutral amino acids commonly found in the hydrolyzates of proteins or peptides. Elution was started at 30° C. with pH 3.25 (0.20 N) sodium citrate buffer. A buffer change was made to pH 4.25 (0.20 N) sodium citrate and a temperature change was made to 55° C., to coincide with the 55° temperature used in the hydrolyzate procedure. With the column 12 provided as indicated at 19 with a metallic coating comprising rhodium having a thickness of approximately 0.5 micron, the column operated at a pressure of 3.34 p.s.i./cm.

It will be appreciated of course, as indicated heretofore, that the electrically conductive rhodium coating could be replaced by any suitable electrically conductive coating either metallic or generally non-metallic which conforms to the parameters set forth hereinbefore and comprising substances such as gold, silver, platinum, nickel, iron, cobalt, copper, aluminum (as oxide), magnesium (as oxide), chromium salt (stabilized), chromates of gold and silver, sulfonated polystyrene, etc. Furthermore, it is noted that the resolution of the complex physiological mixtures is superior with the utilization of the method and means proposed by the present invention.

Example II

As a control, the above procedure was repeated with the exception that the column 12 was not provided with a conductive coating such as 18. The column conditions were found to be such that the effective cross-sectional area of the ion exchange resin with respect to liquid flow was found to be substantially less than the geometrical cross-sectional area of the column. The effective cross-sectional area in fact was found to approximate the area in FIGURE 2 delineated by the circuit 30 thereby not only substantially reducing the efficiency of the column but adversely affecting the resolution of the sample being analyzed. The eluant flow back-pressure was found to be approximately 5.44 p.s.i./cm. in the non-coated column, almost double the back-pressure in the coated column, and the column bed length was found to have to be approximately 30% longer than the column length of the coated column in order to achieve equivalent resolution.

The detrimental effects as noted by the above data are due to the orientation of the ion exchange resin by the random van der Waal's forces and showing media charges effecting an impeded cross-sectional liquid flow, i.e. by decreasing the cross-sectional area of ion exchange resin available for liquid flow. The impeded liquid flow is dramatically illustrated by the flow back-pressure changes, apparent from the above data. The detrimental effect upon resolution is graphically illustrated by the above data relative to the additional length of the ion exchange resin bed required in the uncoated column necessary for resolution equivalent to that obtained with a coated column.

From the foregoing it will be apparent that the present invention satisfies the several objects set forth hereinabove and thus provides an improved method and means of accelerated chromatographic analysis of fluids without the deleterious effects of electrical charges such as those resulting from random van der Waal's forces, flowing media charges, and the like.

The foregoing is considered as illustrative only of the principles of the invention. It will be apparent to those skilled in the art that the teachings of this application extend to colloidal systems other than ion exchange resin glass columns, for instance, such an extension might be the analyses of blood (as a colloid), glass, soil (as a colloid) and the like, where other natural and synthetic formed matrices have been substituted for the colloidal ion exchange resin matrix. Other container forms such as pipettes, burettes, etc. may be substituted for the glass column. Further since, numerous modifications and changes will readily occur to those skilled in the art, it is not desired to limit the invention to the exact method and construction shown and described, and accordingly all suitable modifications and equivalents may be resorted to, falling within the scope of the invention as claimed.

What is claimed as new is as follows:

1. In a chromatographic method of analysis utilizing a packed ion exchange resin column the improvement which comprises coating a portion of the interior of the column contiguous with the ion exchange resin therein with an electrically conductive substance to effectively neutralize undesirable electrical charges within the resin which tend to substantially reduce the effective cross-sectional area of the column.

2. The method of claim 1 wherein said coating comprises a conductive substance selected from the group consisting of elemental metals, metal alloys, metallic oxides, metallic salts and polyelectrolytes.

3. In a system for the chromatographic analysis of a colloid including an ion exchange column the improvement which comprises coating at least a portion of the interior of the ion exchange column with an electrically conductive substance to effectively neutralize undesirable electrical charges within the ion exchange column.

4. In combination with an ion exchange column constructed of a generally electrically non-conductive material an electrically conductive coating on the interior wall of the ion exchange column to prevent the build-up of undesirable electrical charges which tend to substantially reduce the effective cross-sectional area of the column.

5. In combination with an ion exchange column constructed of electrically non-conductive material filled diametrically by a bed of ion-exchange resin particles, an electrically conductive means integral with the interior surface of said non-conductive material column to prevent the buildup of undesirable electrical charges within the resin bed contained by said column whereby it is assured that the effective cross-sectional flow area of the column approximates the free cross-sectional flow area of the column.

6. The combination of claim 1 wherein said electrically conductive means comprises an interiorly disposed electrically conductive coating comprising a substance selected from the group consisting of elemental metals, metal alloys, metallic oxides, metallic salts and polyelectrolytes on the interior surface of said ion exchange column.

7. The combination of claim 6 wherein said coating is of a transparent nature.

8. The combination of claim 6 wherein said coating is of a translucent nature.

9. The combination of claim 6 wherein said metallic coating is of a maximum thickness in the order of approximately 0.5 micron.

References Cited

UNITED STATES PATENTS

| 3,298,160 | 1/1967 | Hoffmann | 55—67 |
| 3,352,643 | 11/1967 | Ando et al. | 23—253 XR |
| 3,387,710 | 6/1968 | Pogacar | 55—197 XR |

FOREIGN PATENTS

| 937,074 | 9/1963 | Great Britain. |

MORRIS O. WOLK, Primary Examiner

R. M. REESE, Assistant Examiner

U.S. Cl. X.R.

23—232, 254; 73—23.1; 210—31, 94, 243, 282, 287